United States Patent [19]

Heidman, Jr.

[11] Patent Number: 4,638,296
[45] Date of Patent: Jan. 20, 1987

[54] DIRECTIONAL SIGNAL SWITCH AND ALTERNATING LIGHTING OF REAR LAMPS

[76] Inventor: William A. Heidman, Jr., 4604 Robbins, San Diego, Calif. 92122

[21] Appl. No.: 387,457

[22] Filed: Jun. 11, 1982

Related U.S. Application Data

[63] Continuation-in-part of Ser. No. 139,789, Apr. 14, 1980, Pat. No. 4,354,174.

[51] Int. Cl.$^4$ .............................................. B60Q 1/46
[52] U.S. Cl. ...................................... 340/83; 340/72; 340/81 R
[58] Field of Search .................... 340/67, 66, 72, 73, 340/81 R, 82, 83, 81 F; 200/61.3, 61.27, 44, 61.57

[56] References Cited

U.S. PATENT DOCUMENTS

| | | | |
|---|---|---|---|
| 2,060,951 | 11/1936 | Rae et al. | 200/44 |
| 2,133,572 | 10/1938 | Rowe | 200/61.27 |
| 3,720,917 | 3/1973 | Dyksterhouse | 340/82 |
| 3,745,524 | 7/1973 | Suzuki | 340/81 F |
| 3,925,759 | 12/1975 | Lucas | 340/81 R |
| 4,351,991 | 9/1982 | Morita et al. | 200/61.3 X |

OTHER PUBLICATIONS

National Highway Traffic Safety Admin., Dept. of Transportation, Title 49, pp. 209–217.

Primary Examiner—Gerald L. Brigance
Attorney, Agent, or Firm—Frank D. Gilliam

[57] ABSTRACT

Directional signaling for automobile vehicles in which vehicle turning is indicated by the flashing of the front turn signal lights and the alternate flashing of the combined brake and rear turn lights. A key operated ignition switch is provided that renders the battery voltage off all direction signaling circuits in the "off" position, allows all directional circuits to be energized with battery voltage in the "on" and the "accessory" positions and permits the key to be removed in both the "off" and "accessory" positions. In one embodiment, relay operated switches in conjunction with a conventional flasher unit provide selective flashing of the left or right signal lamps and disconnects brake lamp illumination on the turn signal activated side. The brake light switch is rendered ineffective when the stop lights are being used as turn signals. In another embodiment, the brake lights are utilized in combination with backup lamps.

12 Claims, 4 Drawing Figures

DIRECTIONAL SIGNAL SWITCH AND ALTERNATING LIGHTING OF REAR LAMPS

BACKGROUND OF THE INVENTION

This application is a continuation-in-part of my U.S. Pat. No. 4,354,174 titled "Anti-Theft Door Actuated Hazard Light and Horn Circuits for Automobiles" issued on Oct. 12, 1982.

This invention relates to improvements in automotive turn signal circuits and more particularly to visual signal perception and motor vehicle lighting associated therewith.

Direction signal lights on the front and rear of motor vehicles are well known. These generally take the form of flashing lamps on front of the automotive vehicle and flashing turn signal lamps on the rear thereof.

Examples of prior art automobile vehicle turn signal means are generally shown in my prior U.S. Pat. Nos. 3,372,374; 3,372,373; 3,263,211; and 2,766,343.

Examples of prior art automobile vehicle combination ignition and accessory switches can be found in my prior U.S. Pat. Nos. 2,519,758 and 2,520,363.

At least one vehicle manufacturer provides a plurality of horizontally positioned, side-by-side red brake lights on each side of the rear of the vehicle and when activated to a directional turning mode, sequentially light, then extinquish, from the innermost lamp position to the outermost lamp position in a repetitive fashion.

Although the various means included above have greatly improved the visibility of automotive vehicle turning signals, there is still an enormous amount of research being done to improve turn signal reception.

SUMMARY OF THE INVENTION

Briefly, the conventional rear brake lights, turn indicator lights and front turn signal lights of an automotive vehicle are utilized in an improved manner to increase the awareness of drivers of automobiles when a nearby automotive vehicle is planning to turn from its current path of travel.

The brake and turn signal and backup lights of an automotive vehicle are interconnected with a turn signal switch commonly positioned on the steering column of the vehicle, which interconnects the various light circuits with a conventional directional or emergency flasher unit. When a turn is anticipated and the turn signal switch on the steering column is so positioned in the direction of that turn, the brake and turn signal lights on the rear of the vehicle alternately flash. Thus, it appears from the rear of the vehicle that the brake and turn signal light are alternately flashing on and off at a selected rate, determined by the cycle frequency of the flasher element, and the front turn signal light is flashing in its normal manner in one embodiment. The circuit is wired such that the rear turn signal light does not illuminate quite as bright as the brake light, therefore, the turn signal light is made to appear yellow by either coloring the bulb or providing a yellow lens over a white bulb. The filtering effect of the colors red and yellow are such that they both visually appear to have the same intensity when illuminated even though their levels of illumination are slightly different.

Circuit means is provided to remove the brake light switching circuit from its normal turn/brake light function while operating the turn signals so that the application of the brakes during turn signal application will not affect the turn indication functions.

A principal object of this invention is to provide a more visual perceptive motor vehicle turn signaling system.

Another object of this invention is to provide alternating turn signal lights positioned on each side of the rear of automotive vehicles to enhance attention thereto.

Another object of this invention is to provide alternating turn signal lights of different colors on each side of the rear of automotive vehicles.

Still another object of this invention is to provide alternating turn signal lights on each side of the rear of an automotive vehicle of apparent equal visual intensity.

Still a further object of this invention is to provide a means of removing the effectiveness of the brake light switch while operating the brake lights as turn signals whereby the flashing of the brake lights is not affected by activation of the brake light switch.

These and other objects of this invention will become apparent from the following description taken together with the accompanying drawings.

DETAILED DESCRIPTION OF THE DRAWINGS

Throughout the figures and description, the same numerals are used to identify the same or similar element.

Figure 1:
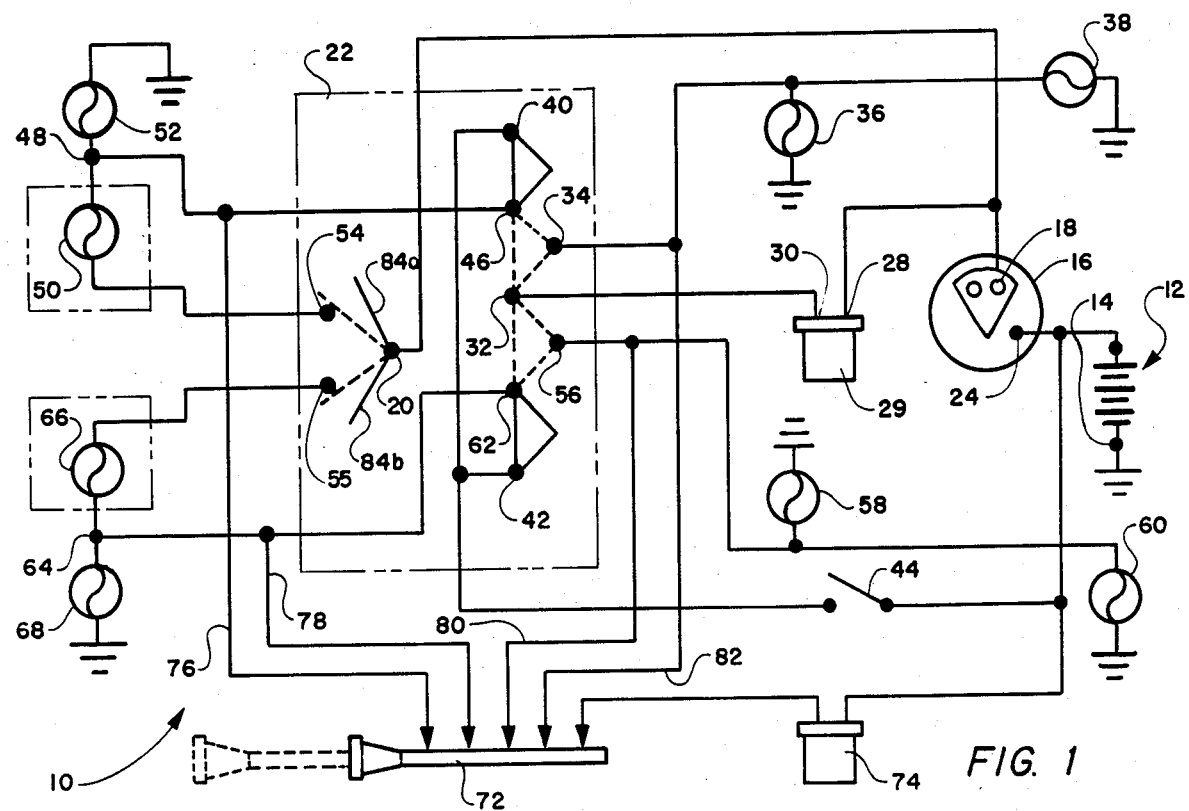
FIG. 1 is a schematic wiring diagram showing the first embodiment of the invention.

Referring to the drawings in detail and in particular to FIG. 1, the reference character 10 generally designates the first embodiment of the combined turn signaling, braking and hazard warning system. A battery 12 is connected to ground through its negative terminal 14 and its positive terminal to an ignition switch 16. Terminal 18 of the switch 16 is connected to the stator 20 of a double pole double throw portion of a turn signal switch 22 and to the terminal 28 of a conventional automotive signal flasher 29 well known in this art. The battery positive terminal 12 is connected to switch contact 24. Terminal 30 of the signal flasher 29 is connected to the terminal 32 of a second double pole double throw portion of the turn signal switch 22.

The turn signal switch 22 is shown in its neutral or inactivated position. Terminal 34 of the turn signal switch 22 is connected to one side of the conductive element of the signal flash indicator dash lamp 36, generally of about two candlepower, and to the vehicle front turning signal lamp 38, generally about thirty-two candlepower. The other side of the conductive element of both of the lamps 36 and 38 are returned to ground (battery negative) to complete their electrical circuit. Terminals 40 and 42 of the switch 22 are connected to the brake light activation switch 44 the opposite side of which is also connected to the positive pole of the battery 14.

Terminal 46 of switch 22 is connected to the connection 48 which is common with one side of the filaments of both of the lamps 50 and 52. These lamps are also generally about thirty-two candlepower. Lamp 50 is positioned as a an alternating rear turn signal lamp which is on the rear portion of modern automotive vehicle. For the purpose of this invention as hereinafter discussed in more detail, this lamp or its outer lens is preferably yellow in color. Light 52 is a conventional automotive brake lamp and is generally clear with a red colored over-lens. The opposite end of the filament of the lamp 52 is connected to battery ground or negative potential.

The opposite end of the filament of lamp 50 is connected to the terminal 54 of the switch 22.

The other half of the switch is wired in a similar manner as discussed above. Terminal 62 of switch 22 is connected to one side of the filaments of both the dash lamp signal flash indicator lamp 58 and front turn signal lamp 60. The other side of the filament of the last two mentioned lamps are connected to ground potential (battery negative). Terminal 62 of the switch 22 is connected to a common connection 64, which is common to one side of the filament of both lamps 66 and 68. The opposite side of the filament of lamp 68 is connected to ground potential (battery negative) and will appear red in color when illuminated as indicated above. The opposite end of the filament of the lamp 66 is connected to the terminal 55 of the switch 22.

Switch 22 and hereinafter described switch 122 are steering column mounted switches which are more fully described in my aforementioned U.S. Pat. No. 4,354,174.

A hazard warning switch 72, when in its closed position, interconnecting the positive pole of the battery 12 through a second conventional signal flasher element 74. The switch 72 is connected through lines 76, 78, 80 and 82 to terminals 46, 62, 56 and 34 respectively of the switch 22. In the phantom showing or open position of the switch 72, voltage is removed from the hazard warning system and the system is rendered inoperative.

In operation, the circuit of FIG. 1 is activated by closing switch 16, the two portions being ganged together. With switch 22 in the left turn position which terminals 32, 34 and 46 are common, the flasher 29 draws current, momentarily completing connection between the battery and the common connections of the switch 22. Switch arm 84a of switch 22 is now in a closed position, provides a connection between terminals 54 and 20 applying the battery voltage to terminal 54. With the flasher switch contacts momentarily closed, battery voltage is applied to the common filament terminal 48 of the lamps 50 and 52. The opposite side of the filament of the lamp 50 also has the battery voltage applied thereto, therefore, lamp 50 will not illuminate. The battery voltage at the lamp's common connection 48 causes the filament of lamp 52 to illuminate and the battery voltage now present at terminal 34 from terminal 32 of switch 22 causes the filaments of both lamp 36 and 38 to illuminate. When the connection through the flasher 29 circuit opens mementarily, the battery voltage is removed from the common filament connection 48 and from the terminal 34 of the switch 22. The absence of battery voltage at these locations causes the filament of lamp 50 to illuminate (slightly dimmer than the intensity of its normal illumination) and the filaments of lamps 52, 36 and 38 to barely glow and not illuminate in their normal manner. It should be understood that the current through the filament of lamp 50 is divided between two paths to battery negative, namely, the filaments of lamps 52, 36 and 38. It has been determined that if lamp 50 is either colored yellow or is white with a yellow lens cover, it will have the visual appearance of having substantially its normal intensity even though the filament has less actual current flow, resulting in a slightly lower level of illumination.

The opposite side of the circuit of FIG. 1 operates in the same manner as discussed above for the first side of the circuit. Terminals 62, 56 and 32 of the switch 22 are common when the switch 22 is operated for signaling in the opposite turn direction (right). Switch arm 84b of the switch 22, in its phantom indicated position, causes the terminals 20 and 55 to become common, causing the lamps 58, 60, 66 and 68 to operate in the same manner as their counterparts discussed above for the left turn signaling.

Figure 2:
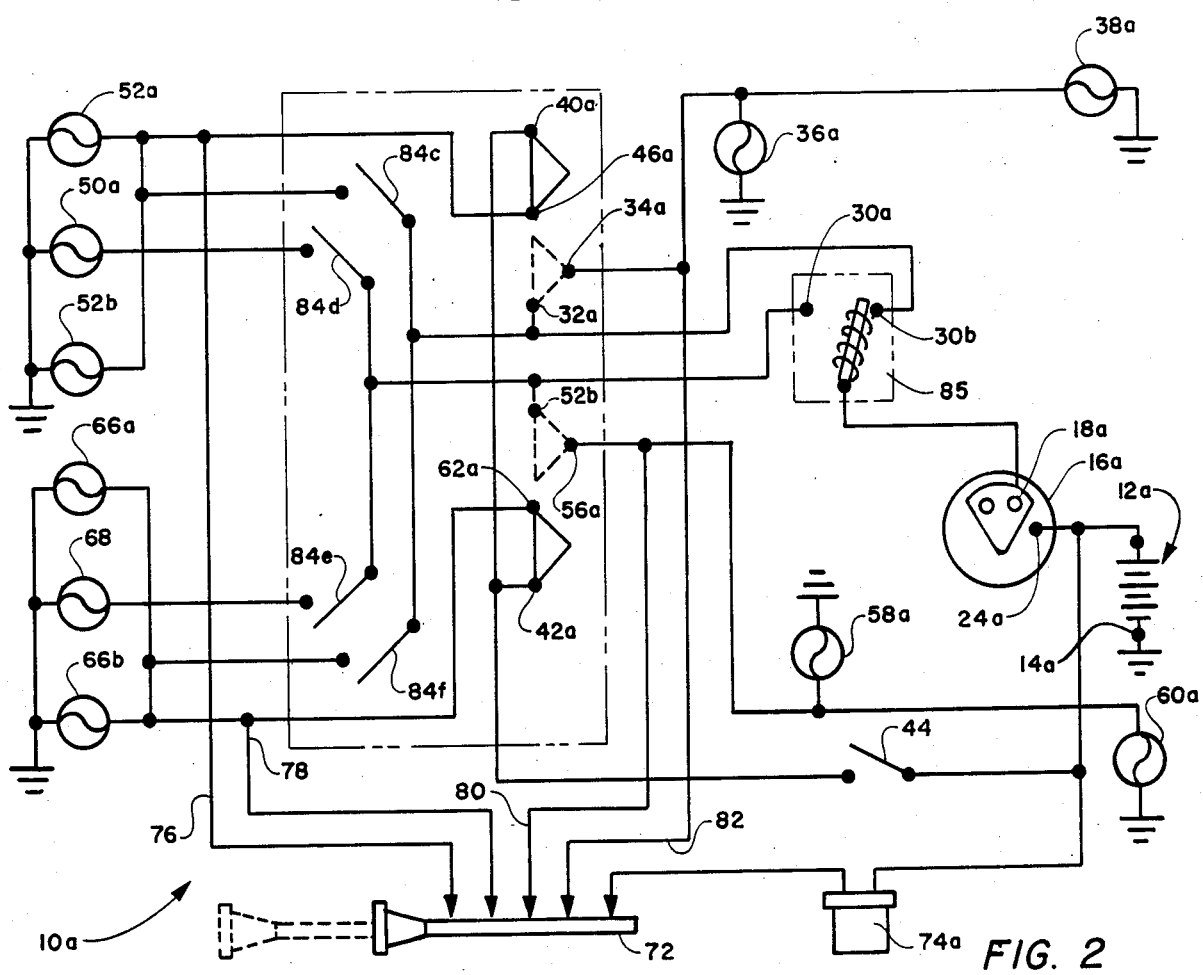
FIG. 2 is a schematic wiring diagram of the invention slightly different than the showing of the first embodiment of FIG. 1.

Referring now specifically to FIG. 2, the reference character 10A generally designates a second electrical circuit for a combined turn signaling, braking and hazard warning system utilizing an alternating flasher element.

This circuit closely resembles the circuit generally referred to as 10 in both wiring and operation. The flasher element 85 alternately switches between its contacts 30a or 30b which, when ignition switch 16a is closed (shown in its open position), alternately illuminates the rear lamps 52a and 52b with 50a, dash light 36a and front turn signal lamp 38a for one side of the vehicle and lamps 66a, and 66b, with 68a, dash indicator 58a, and front turn signal lamp 60a for the other side of the vehicle. The hazard and brake lamps operate in the same manner discussed above.

It should be understood that in the FIG. 2 circuit, one connection of each lamp element is connected directly to negative or ground potential, therefore, each like lamp element will illuminate with equal intensity.

Figure 3:
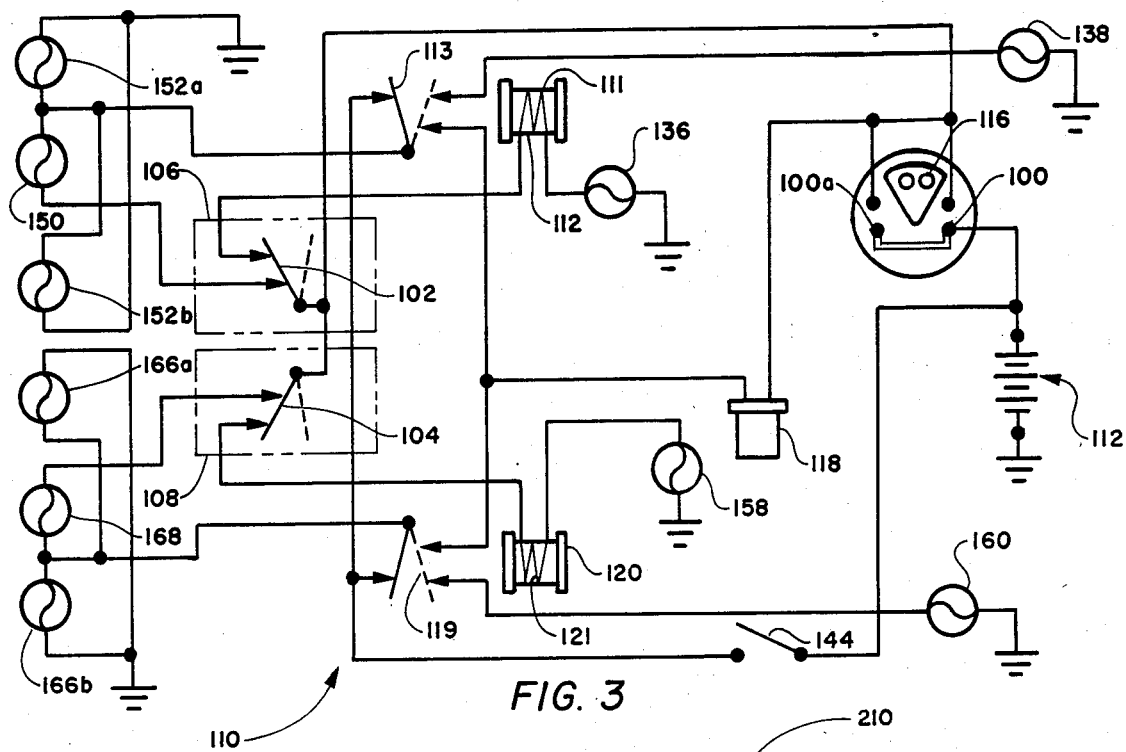
FIG. 3 is a schematic wiring diagram showing of a second embodiment of the invention.

Referring now specifically to FIG. 3, a circuit for a second embodiment of the invention is shown and designated generally as 110. The positive pole of battery 112 is connected to the brake light switch 144 and contacts 100 and 100a of the three position ignition switch 116 and to the brake switch 144. The ignition switch 116 is a typical key operated ignition switch found in most modern automotive vehicles. The switch 116 has three positions, namely, neutral or off as shown, to a right (in the figure), "on" position for energizing the ignition and the accessories including the turn indicators and to a left (in the figure), ignition off-accessory "on" position. For ease of the following explanation, the ignition switch will be considered as positioned in either the "on" or accessory "on" position. The ignition switch 116, when positioned as above mentioned, provides battery voltage to the contact arms 102 and 104 of the steering wheel positioned switches 106 and 108 respectively. These rocker switches 106 and 108 operate in the same manner as switches 206 and 208 hereinafter described. With the contacts 102 of the closed switch 106 as shown in the solid lines of the drawing, current flows through the filaments of lamp 150, 152a and 152b, the coil winding 111 of the relay 112 and through the filament of dash lamp 136 to ground or negative battery potential. The current through the winding 111 of relay 112 pulls its switch 113 to the right, in the figure, connecting the flasher element 118 through the filament of front left turn signal lamp 138 to ground and to the common electrical connection between the filaments of lamps 150, 152a and 152b. Switches 106 and 108 may be conveniently mounted on each side of the steering wheel for thumb operation by the driver. The switch positioned on the right side of the steering wheel would operate right hand signal lights and the switch on the left side of the steering wheel would correspondingly operate left hand signal lights. These rocker switches would be the same as the thumb operated horn switches on new cars. Instead of horn switch to horn relay, it would be rocker switch to the turn and hazard circuits. In the circuit of FIG. 3, both the turn signals and hazard lamps operate alternately at rear of the vehicle.

With the circuit in this mode and with the flasher 118 switch contacts closed, the filaments of lamps 138, 136, 152a and 152b illuminate and when the flasher switch contacts are open circuit, the filament of the lamp 150 illuminates substantially at a normal level of intensity, the filament of the lamp 136 illuminates at a lower level of intensity through coil 111 and the filaments of the lamps 138, 152a and 152b have an indistinguishable glow.

When the switch 102 is in an open position (shown by dashed lines) and the switch 104 is in a closed position as shown, the opposite side of the circuit operates in the same manner as the side above described. The coil 121 of relay 120 is energized, illuminating dash lamp 158 and causing the switch 119 to move to the right (phantom showing). When the contacts of the flasher switch 118 are closed, the filaments of lamps 160, 166a and 166b illuminate, and when the contacts of flasher switch 118 are in an open circuit condition, the filament of the dash lamp 158 remains illuminated, the filament of lamp 168 illuminates substantially in a normal manner and the filaments of the rear turn signal lamps 160, 166a and 166b glow, which cannot be detected.

When both the switches 102 and 104 are in a closed position, for hazard signaling the filaments of both sets of lights illuminate as described above. It should be noted that when the contact arms 102 and 104 are activated, the brake light circuit to the filaments of lamps 152a, 152b, 166a and 166b is inactivated so that the closure of the brake switch 144 will not affect the operation of the alternate flashing lights of the hazard signal indication.

Preferably, the ignition switch 116 employed in the FIG. 3 circuit is constructed so as to allow the ignition key to be removed in either the "off" or accessory "on" positions.

Figure 4:
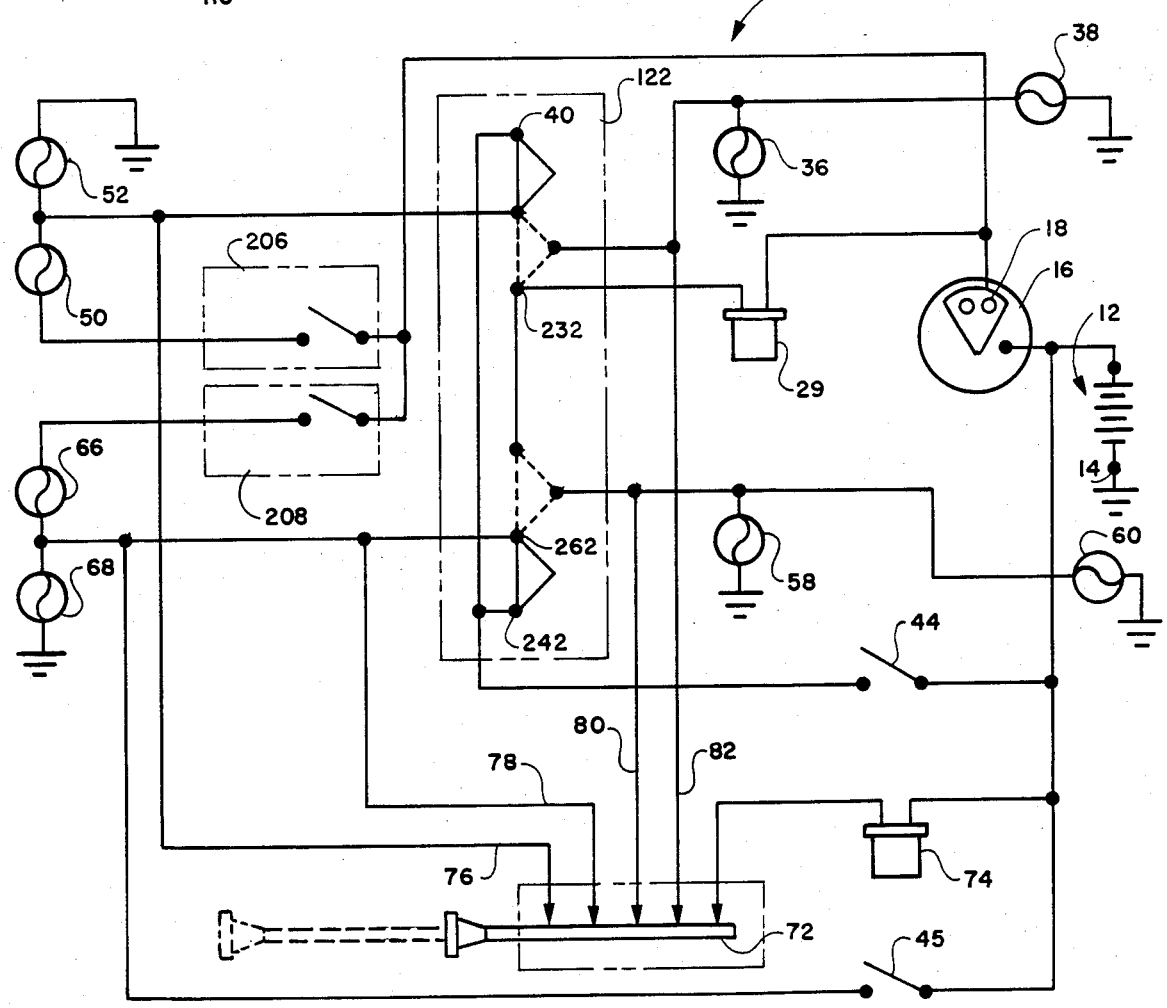
FIG. 4 is a schematic showing of a third embodiment of the invention.

Referring now to FIG. 4 wherein 210 generally designates a circuit for the third embodiment of the invention. In the third embodiment of the invention, the circuit generally designated as 210 is substantially the same as the first embodiment both in layout and operation. The basic difference being: The addition of a backup lighting circuit includes a separate switch 45 which is connected between the battery positive terminal and the common filament electrical connection between the rear turn signal lamp 50 and the brake lamp 52 and the rear turn signal lamp 66 and the brake lamp 68; and the use of the separate switches 206 and 208 which are external to the steering mounted turn signal switch 122 rather than being common therewith as are elements 84a and 84b of the switch 22 of FIG. 1. Switches 206 and 208 are wired in complement to switch 122 and have the same combined wiring as described for the switch 22.

Switches 206 and 208 are rocker switches which rock between a center or neutral position to a press to contact in one direction and a press to lock in contact in the opposite direction. In the press to contact position, the switch immediately returns to its neutral open position when released and when in the press to lock contact holds contact until pressed the second time, wherein it also returns to its neutral open position. Switch 122 is a conventional automotive steering column directional signal switch well known in this art.

Referring again to the electrical circuits of FIGS. 3 and 4. In the FIG. 3 circuit, the rocker switches 106 and 108 are generally used in their press-to-contact positions for indicating turning and lane changing and their press-to-lock positions for hazard signaling. In the FIG. 4 circuit, the rocker switches 206 and 208 are generally used in their press-to-contact mode for turning and lane changing signaling and a conventional hazard pull switch is utilized for hazard signaling.

It should be understood that the position of the rear lamps on the various schematics generally represents a plan view of the physical location of the lamps on the vehicle.

As before described in the operation of the FIG. 1 circuit, the brake switch 44 is electrically removed from the circuit when either the directional signals or hazard warning switches are activated. Obviously, when the backup switch 45 is closed, the filaments of lamps 52 and 68 (the normal brake lamps) will illuminate in a steady state as will the backup lamps.

It will be apparent to those skilled in the art that many modifications and variations may be effected without departing from the spirit and scope of the novel concepts of the present invention.

What is claimed is:

1. A turn signal switching circuit for an automotive vehicle, said vehicle having an ignition switch with an output terminal, first and second turn signal and brake lamp circuits each having at least one front turn signal lamp, rear turn signal and brake lamp on opposite sides of said vehicle, each of said lamps have first and second element connections comprising:

a flasher element having an input connection connected to the output terminal of said ignition switch and an output connection;

a common electrical ground;

a battery having a positive and negative terminal, said positive terminal connected to the input terminal of said ignition switch and said negative terminal connected to said common electrical ground;

a turn signal switch interconnected between the first element connection of said front and rear turn signal lamps and brake lamps circuits and the output connection of said flasher element for selectively connecting one of said turn signals and brake lamp circuits to the output connection of said flasher element;

switching means mechanically interconnected to said turn signal switch for operation therewith and electrically interconnected between the output terminal of said ignition switch and the second terminal of the rear turn signal lamp on each side of said vehicle; and said second element connection of said brake lamp and front turn signal lamp on each side of said vehicle is connected to said common electrical ground, said turn signal switch and mechanically interconnected switching means acting, when operated for lamp illumination on a selected side of said vehicle to illuminate said rear turn signal lamp alternately with illumination of said brake, and front turn signal lamps on said selected side of said vehicle.

2. The invention as defined in claim 1 further comprising a brake lamp circuit including a brake lamp switch connected between said battery and the brake lamps, said switching means disconnecting said brake lamp circuit from said brake lamps when switched to operate said lamps alternately with said rear turn signal lamp on a selected side of said vehicle.

3. The invention as defined in claims 1 or 2 further comprising a hazard warning circuit including a second flasher element and a switch interconnected between said positive terminal of said battery and said lamps on each side of said vehicle whereby when said switch is operated, all of the turn signal lights on said vehicle illuminate on and off at the frequency of the second flasher element.

4. The invention as defined in claim 1 additionally comprising lens means associated with said lamps wherein said rear brake lamps indicate red when illuminated and said turn signal lamps indicate yellow when illuminated.

5. The invention as defined in claim 4 wherein the brake lamp and turn signal lamp when separately illuminated visually appear to have the same illumination intensity due to the color difference.

6. The combination as defined in claim 1 further comprising a second flasher element selectively connected between the first electrical connection of said battery and said brake and front turn signal lights.

7. The combination as defined in claims 1 or 2 further comprising pilot turn signal lights connected electrically in parallel with said front turn signal lights.

8. The combination as defined in claim 1 wherein the color of said brake lights and said rear turn signal lights are different, whereby when alternately illuminated they appear to have the same intensity.

9. The combination as defined in claim 1 wherein a backup switch interconnects the first electrical connection of said battery with the first filament connection of the brake lights.

10. The invention as defined in claim 1 wherein said ignition switch is key operated between "off"; "on" and "accessory on" positions, and said key is removable from said switch in said "accessory on" position for connecting said flasher element directly to said positive terminal of said battery bypassing said ignition circuit for hazard mode.

11. The invention as defined in claim 1 further comprising a second brake lamp having first and second element connections positioned each side of said vehicle, said first element connection connected to said switching means and said second element connection connected to said common electrical ground when said turn signal switch and mechanically interconnected switching means acting, when operated for lamp illumination on a selected side of said vehicle to illuminate said brake lamps and front turn signal lamp illuminate at a normal illumination alternately with said rear turn signal lamp illuminating at a normal level, while said front turn lamp and brake lamps illuminate at an indistinguishable glow.

12. The invention as defined in claim 1 wherein when said turn signal switch is in a selected vehicle side on position said brake lamp and front turn signal lamp illuminate alternately with said rear turn lamp of less than full illumination while said brake and front turn lamps slightly glow.

* * * * *